(12) United States Patent
Hanley et al.

(10) Patent No.: US 10,185,345 B2
(45) Date of Patent: Jan. 22, 2019

(54) SYSTEMS AND METHODS OF HOME EFFICIENCY MODELING

(71) Applicant: SolarCity Corporation, San Mateo, CA (US)

(72) Inventors: Ryan Hanley, Berkeley, CA (US); Brian Zimmerly, Oakland, CA (US)

(73) Assignee: SolarCity Corporation, San Mateo, CA (US)

( * ) Notice: Subject to any disclaimer, the term of this patent is extended or adjusted under 35 U.S.C. 154(b) by 560 days.

(21) Appl. No.: 14/746,463

(22) Filed: Jun. 22, 2015

(65) Prior Publication Data

US 2016/0370814 A1   Dec. 22, 2016

(51) Int. Cl.
*G05F 1/66*   (2006.01)
*H02J 3/00*   (2006.01)
*G05B 15/02*   (2006.01)

(52) U.S. Cl.
CPC .............. *G05F 1/66* (2013.01); *G05B 15/02* (2013.01); *H02J 2003/007* (2013.01)

(58) Field of Classification Search
CPC ...... G05B 15/02; G05F 1/66; G06Q 30/0202; H02J 2003/007
See application file for complete search history.

(56) References Cited

U.S. PATENT DOCUMENTS

| | | | |
|---|---|---|---|
| 8,447,541 B2 | 5/2013 | Rada et al. | |
| 8,560,133 B2 | 10/2013 | Venkatakrishnan et al. | |
| 8,560,134 B1 | 10/2013 | Lee | |
| 8,600,562 B2 | 12/2013 | Oswald | |
| 8,903,561 B1 | 12/2014 | Mannepalli et al. | |
| 9,269,062 B2* | 2/2016 | Dhillon | G06Q 50/06 |
| 2003/0061091 A1 | 3/2003 | Amaratunga et al. | |
| 2006/0123807 A1 | 6/2006 | Sullivan et al. | |
| 2010/0145534 A1* | 6/2010 | Forbes, Jr. | G06Q 10/00 700/291 |
| 2011/0106327 A1* | 5/2011 | Zhou | G05B 13/024 700/291 |
| 2011/0276194 A1 | 11/2011 | Emalfarb et al. | |
| 2012/0083930 A1* | 4/2012 | Ilic | G06Q 30/06 700/287 |

(Continued)

*Primary Examiner* — Jennifer L Norton
(74) *Attorney, Agent, or Firm* — Kilpatrick Townsend & Stockton LLP

(57) ABSTRACT

A method for modeling energy efficiency of a site comprises: (1) receiving temperature data associated with the site from a sensor, the temperature data including a starting temperature of the site and a corresponding starting time of a climate control system, and an ending temperature of the site and a corresponding ending time of the climate control system; (2) receiving power consumption data associated with the site from a power meter, the power consumption data including power consumption of the climate control system at the site; and (3) determining the energy transfer function that models an energy efficiency of the site based at least partially on a time it takes for the site to reach the ending temperature from the starting temperature, and the power consumption of the climate control system from the starting time to the ending time, wherein the energy transfer function determines a predicted power consumption as a function of temperature change and time.

6 Claims, 10 Drawing Sheets

(56) References Cited

U.S. PATENT DOCUMENTS

| | | | |
|---|---|---|---|
| 2012/0130924 A1* | 5/2012 | James | G01W 1/10 |
| | | | 705/412 |
| 2012/0232701 A1* | 9/2012 | Carty | G05B 15/02 |
| | | | 700/277 |
| 2012/0316808 A1 | 12/2012 | Frader-Thompson et al. | |
| 2013/0110304 A1* | 5/2013 | Shiga | H02J 3/14 |
| | | | 700/295 |
| 2013/0190940 A1 | 7/2013 | Sloop et al. | |
| 2013/0338837 A1* | 12/2013 | Hublou | G05D 23/1923 |
| | | | 700/278 |
| 2014/0031994 A1* | 1/2014 | Pan | G05D 23/1902 |
| | | | 700/278 |
| 2014/0203092 A1 | 7/2014 | Broniak et al. | |
| 2014/0277762 A1 | 9/2014 | Drew | |
| 2015/0227870 A1* | 8/2015 | Noboa | G06Q 10/0635 |
| | | | 705/7.28 |

\* cited by examiner

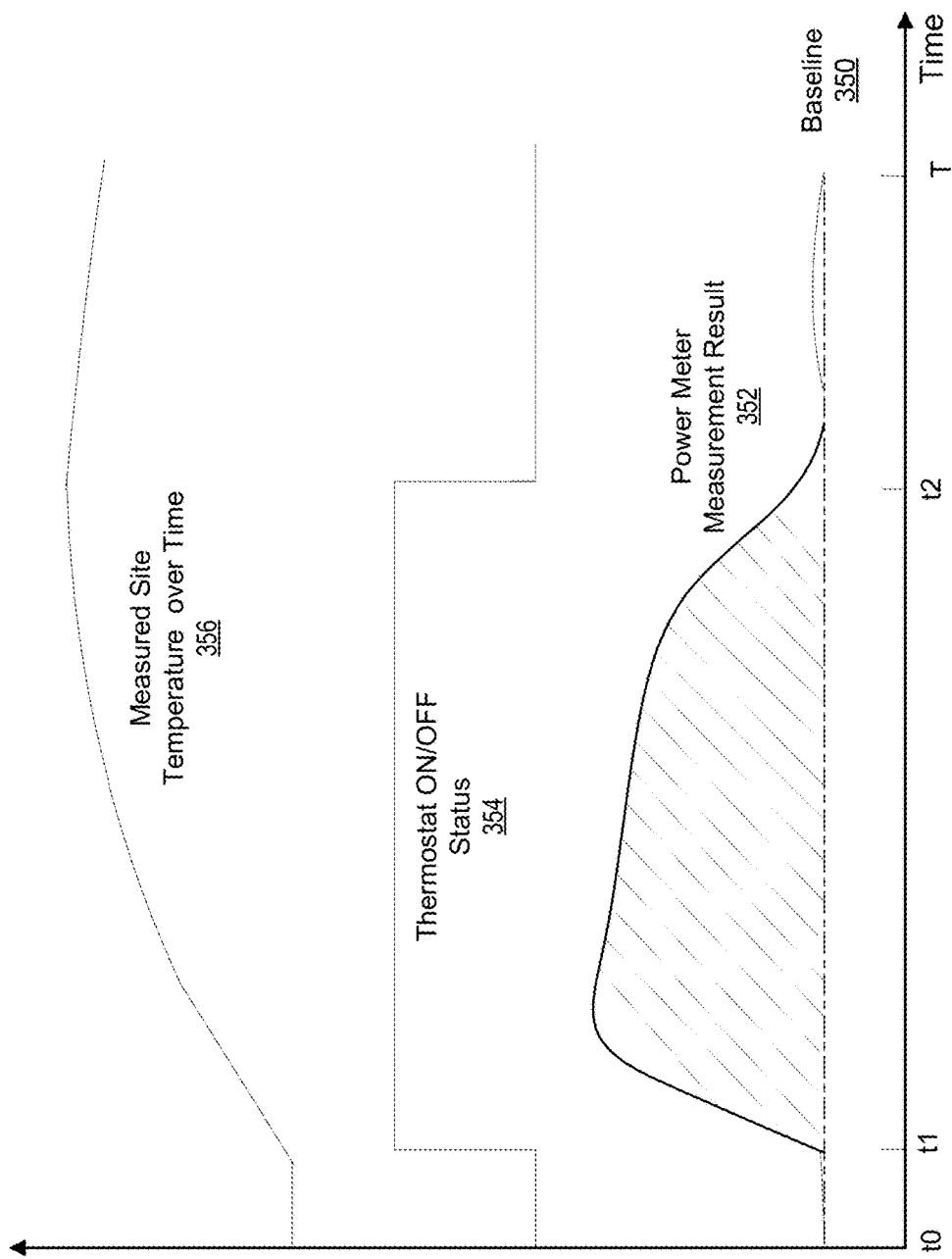

SYSTEMS AND METHODS OF HOME EFFICIENCY MODELING

BACKGROUND

In recent years, climate change concerns, federal/state initiatives, and other factors have driven a rapid rise in the installation of renewable energy generation (EG) systems (i.e., systems that generate energy using renewable resources such as solar, wind, hydropower, etc.) at residential and non-residential sites. Solar photovoltaic (PV) systems, in particular, have been very popular EG systems.

The majority of PV capacity is "grid-connected"—in other words, tied to the utility-maintained electrical grid. This allows site loads to be serviced from the grid at times when the PV system cannot generate sufficient energy due to lack of sunlight (e.g., at night), while enabling energy to be fed back into the grid at times when PV energy production exceeds site loads, thereby allowing the energy to be conveyed to others on the grid.

Energy consumption in a serving area varies over time and under different environmental conditions. Energy price varies at different times as well. It is desirable to predict the energy usage for each home or facility, and thus the total energy usage in a servicing area at a given time, such that better power grid planning can be made, home appliances and other electrical power consuming machines can be controlled to use power from grid or PV energy at appropriate time to reduce overall peak energy usage and energy cost, and PV energy production can be fed onto the grid at appropriate time.

BRIEF SUMMARY

Embodiments of the present invention relate to systems and methods for modeling energy efficiency of a site, such as a building or a dwelling home, and optimizing energy usage based on energy efficiency models of a plurality of sites.

According to one embodiment, a method for modeling energy efficiency of a site comprises: (1) receiving temperature data associated with the site from a sensor, the temperature data including a starting temperature of the site and a corresponding starting time of a climate control system, and an ending temperature of the site and a corresponding ending time of the climate control system; (2) receiving power consumption data associated with the site from a power meter, the power consumption data including power consumption of the climate control system at the site; and (3) determining the energy transfer function that models energy efficiency of the site based at least partially on a time it takes for the site to reach the ending temperature from the starting temperature, and the power consumption of the climate control system from the starting time to the ending time. The energy transfer function determines a predicted power consumption as a function of temperature change and time. In some embodiments, the temperature data associated with the site includes ambient temperature data outside of the site, and determining the energy transfer function of the site is at least partially based on the ambient temperature data outside of the site.

In some embodiments, the method for modeling energy efficiency of a site further includes receiving occupancy information of the site, and determining the energy transfer function of the site based at least partially on the occupancy information of the site.

In some embodiments, the method for modeling energy efficiency of a site further includes receiving structure information of the site, and determining the energy transfer function of the site based at least partially on the structure information of the site. In some embodiments, the structure information of the site includes at least one of volume of air, orientation, surface area, material and structure, type, orientation and number of windows, type of roof, type and area of walls, or type and number of doors of the site.

In some embodiments of methods for modeling energy efficiency of a site, the temperature data and the power consumption data associated with the site are received periodically or continuously, and the energy transfer function of the site is determined periodically or continuously. In some embodiments, the temperature data and the power consumption data associated with the site are received remotely through a network.

In some embodiments, the sensor is a thermostat that records both measured temperatures and the corresponding starting and ending times of the climate control system.

In some embodiments, the temperature data is received from at least one sensor at the site, the starting time is extracted from at least one of voltage signals or current signals measured at the site, and the ending time is extracted from at least one of the voltage signals or the current signals measured at the site.

In some embodiments, the method for modeling energy efficiency of a site further includes receiving at least one of voltage signals or current signals measured at the site from a power sensor; extracting electrical signatures from the at least one of voltage signals or current signals; determining whether an appliance at the site is turned on or off by comparing an electrical signature of the appliance with the extracted electrical signatures; extracting time information associated with turning on or off the appliance; determining power consumption of the appliance based on the extracted time information and the power consumption data associated with the site from the power meter; and determining the energy transfer function of the site based at least partially on the time information associated with turning on or off the appliance and the power consumption of the appliance.

In some embodiments, the method for modeling energy efficiency of a site further includes receiving weather forecast data for a future time, and determining power consumption estimation of the climate control system at the site at the future time based at least partially on the weather forecast data and the energy transfer function of the site. In some embodiments, the method further includes receiving utility price information, and making recommendations on energy usage based at least partially on the utility price information and the power consumption estimation. In some embodiments, the method further includes determining power consumption estimation at a plurality of sites based at least partially on energy transfer functions of the plurality of sites.

According to another embodiment, a system for modeling energy efficiency of a site includes a power meter configured to measure a total power consumption of the site; a sensor configured to measure temperature at the site, and record both measured temperature over time and activities of a climate control system; a server configured to receive the total power consumption of the site from the power meter, the measured temperatures and the activities of the climate control system from the sensor, and weather data, remotely through a network, and generate an energy transfer function of the site, based at least partially on the total power consumption of the site, the measured temperatures and the activities of the climate control system, and the weather data. The energy transfer function determines a predicted power consumption as a function of temperature change and time.

In some embodiments, the system for modeling energy efficiency of a site further includes an activity sensor configured to detect activities at the site for determining whether the site is occupied. In some embodiments, the system for modeling energy efficiency of a site further includes a power sensor configured to measure at least one of voltage signals or current signals provided to the site.

In some embodiments, the server of the system for modeling energy efficiency of a site is configured to receive at least one of structure information of the site, weather forecast data, or utility price information.

In some embodiments, the power meter of the system is configured to measure the total power consumption of the site and send the measured power consumption to the server, periodically or continuously. In some embodiments, the sensor of the server is configured to measure the temperature at the site, and transmit both the measured temperature over time and the activities of the climate control system to the server, periodically or continuously. In some embodiments, the server of the system is configured to generate the energy transfer function of the site periodically or continuously.

According to yet another embodiment, a method of reducing at least one of energy usage or energy cost at a site comprises: (1) determining an energy transfer function that models energy efficiency of the site based on temperature data associated with the site and power consumption data associated with the site, the temperature data including a starting temperature of the site and a corresponding starting time of a climate control system, and an ending temperature of the site and a corresponding ending time of the climate control system, and the power consumption data including power consumption of the climate control system at the site between the starting time and the ending time, wherein the energy transfer function is based at least partly on a time it takes for the site to reach the ending temperature from the starting temperature and the power consumption of the climate control system from the starting time to the ending time; (2) determining, based on the energy transfer function, an adjustment to the climate control system that will reduce at least one of energy usage or energy cost; (3) generating a message that can be acted upon by the climate control system to implement the adjustment; and (4) sending the message to the climate control system enabling the climate control system to alter its power consumption in response to the message.

In some embodiments, the method of reducing at least one of energy usage or energy cost at a site includes determining the energy transfer function that models the energy efficiency of the site based at least partially on weather information at the site.

In some embodiments, the method of reducing at least one of energy usage or energy cost at a site includes determining the energy transfer function that models the energy efficiency of the site based at least partially on occupancy information of the site.

In some embodiments, the method of reducing at least one of energy usage or energy cost at a site includes determining the energy transfer function that models the energy efficiency of the site based at least partially on structure information of the site.

BRIEF DESCRIPTION OF THE DRAWINGS

The detailed description is set forth with reference to the accompanying figures.

FIG. 3B illustrates examples of measured data used by the system of FIG. 3A to generate energy efficiency model of a site.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiments being described.

Embodiments of the present disclosure provide systems and methods for modeling the energy efficiency of a site, such as a home or a building, and optimizing energy usage based on the energy efficiency model. In some embodiments, a method for modeling energy efficiency of a site comprises: (1) receiving temperature data associated with the site from a sensor, the temperature data including a starting temperature of the site and a corresponding starting time of a climate control system, and an ending temperature of the site and a corresponding ending time of the climate control system; (2) receiving power consumption data associated with the site from a power meter, the power consumption data including power consumption of the climate control system at the site; and (3) determining an energy transfer function that models the energy efficiency of the site based at least partially on a time it takes for the site to reach the ending temperature from the starting temperature, and the power consumption of the climate control system from the starting time to the ending time. Based on the energy efficiency models of a plurality of sites, total power consumption for a service area in a future time can be estimated, and optimized energy usage can be achieved.

I. System Environment Examples

The following section describes some examples of system environment in which energy efficiency of a site can be modeled and energy usage can be optimized. It should be appreciated that these examples of system environments are illustrative and not intended to limit embodiments of the present disclosure. For instance, although energy generation (EG) systems or energy generation and storage (EGS) systems are described in the examples, and may improve the energy usage of the system with the additional capabilities of generating electrical power and/or temporarily storing energy, EG systems or EGS systems are not required in some embodiments of the present disclosure for modeling energy efficiency of a site and/or optimizing energy usage at the site.

Figure 1:
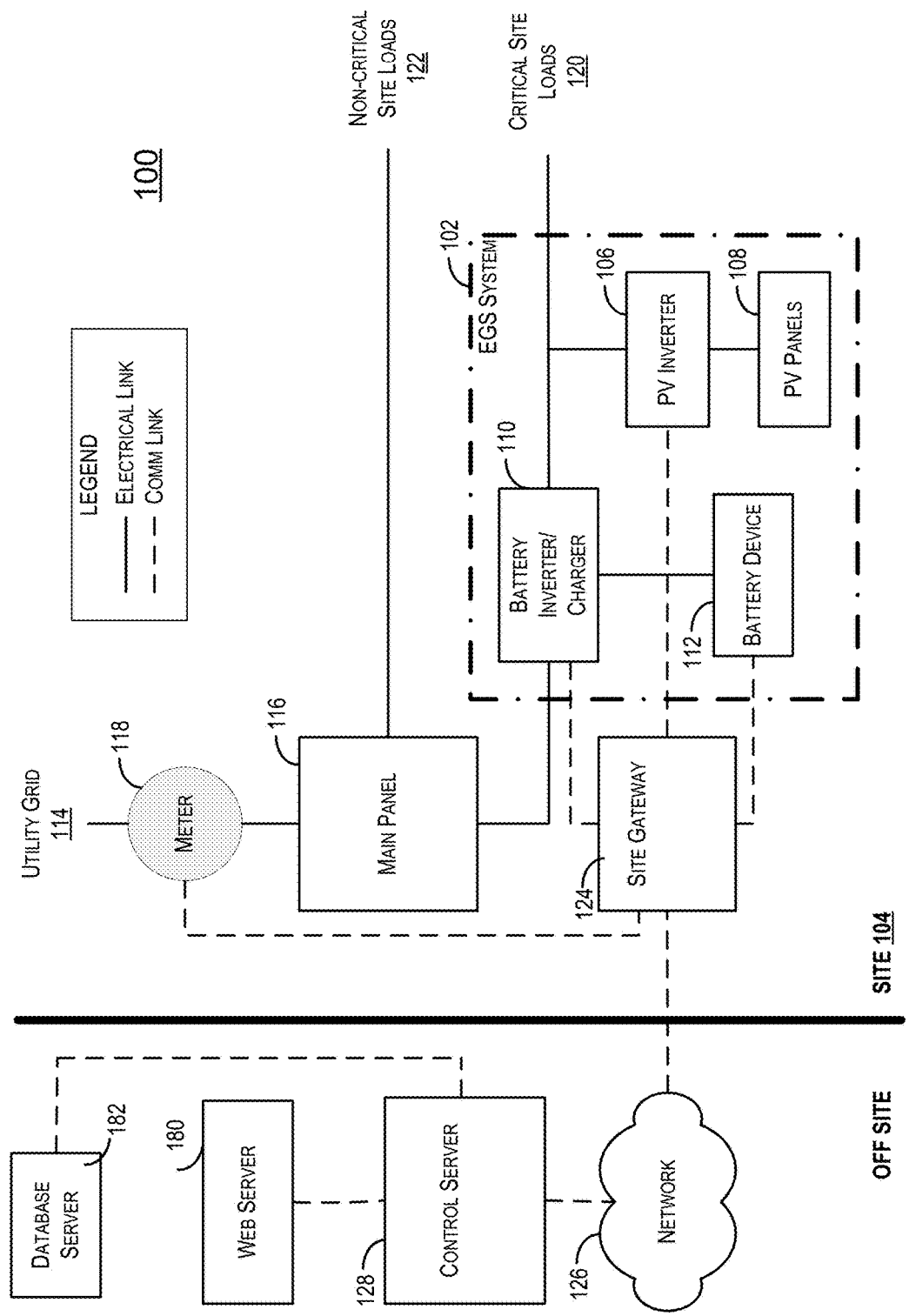
FIG. 1 is a simplified block diagram of a grid-connected PV energy generation system environment in accordance with some embodiments.

FIG. 1 is a simplified block diagram of a grid-connected energy generation system environment 100 according to an embodiment of the present disclosure. As shown, system environment 100 includes an EGS system 102 that is installed at a site 104, for example, a residence, a commercial building, etc. EGS system 102 may include a PV-based energy generation subsystem comprising a PV inverter 106 and one or more PV panels 108, as well as a battery-based energy storage subsystem comprising a battery inverter/charger 110 and/or a battery device 112. In some embodiments, PV inverter 106 and battery inverter/charger 110 can be combined into a single device. In the example of FIG. 1, EGS system 102 is grid-connected; thus, PV inverter 106 and battery inverter/charger 110 may be electrically connected to a utility grid 114, for example, via main panel 116 and utility meter 118 at site 104. Further, to provide power to site 104, utility grid 114, PV inverter 106, and/or battery inverter/charger 110 may be electrically connected to critical site loads 120 and/or non-critical site loads 122.

In some examples, integrated EGS systems such as system 102 may provide a number of advantages over energy generation systems that do not incorporate any on-site energy storage. For example, battery device 112 can be leveraged to "time shift" energy usage at site 104 in a way that provides economic value to the site owner or the installer/service provider of the EGS system 102. For instance, battery inverter/charger 110 can charge the battery device 112 with energy from utility grid 114 (and/or PV inverter 106) when grid energy cost is low. Battery inverter/charger 110 can then dispatch the stored energy at a later time to, e.g., offset site energy usage from utility grid 114 when PV energy production is low or grid energy cost is high, or sell back the energy to the utility when energy buyback prices are high, for example, during peak demand times.

In some embodiments, system environment 100 includes a site gateway 124 and a control server 128. Site gateway 124 may be a computing device (e.g., a general purpose personal computer, a dedicated device, etc.) that is installed at site 104. As shown, site gateway 124 may be communicatively coupled with on-site components 106, 110, 112, and 118, as well as with control server 128 via a network 126. In some embodiments, site gateway 124 can be a standalone device that is separate from EGS system 102. In other embodiments, site gateway 124 can be embedded or integrated into one or more components of system 102. Control server 128 may be a server computer (or a cluster/farm of server computers) that is remote from site 104. Control server 128 may be operated by, for example, the installer or service provider of EGS system 102, a utility company, or some other entities.

In some embodiments, site gateway 124 and control server 128 can carry out various tasks for monitoring the performance of EGS system 102. For example, site gateway 124 can collect system operating statistics, such as the amount of PV energy produced (via PV inverter 106), the energy flow to and from utility grid 114 (via utility meter 118), the amount of energy stored in battery device 112, and so on. Site gateway 124 can then send this data to control server 128 for long-term logging and system performance analysis.

More significantly, site gateway 124 and control server 128 can operate in tandem to actively facilitate the deployment and control of EGS system 102. Specifically, FIG. 1 shows other entities remote from the site (OFF SITE) that may communicate with EGS system 102. These other entities may include a web server 180 and a database server 182.

It should be appreciated that system environment 100 is illustrative and not intended to limit embodiments of the present disclosure. For instance, although FIG. 1 depicts control server 128 as being connected with a single EGS system (102) at a single site (104), control server 128 can be simultaneously connected with a fleet of EGS systems that are distributed at multiple sites. In these embodiments, control server 128 can coordinate the scheduling of these various systems/sites to meet specific goals or objectives. In further embodiments, the various components depicted in system environment 100 can have other capabilities or include other subcomponents that are not specifically described. Furthermore, multiple instances and variants of the control server may exist, each communicating with one or more other control servers, EGS systems and/or other devices connected to EGS system 102. One of ordinary skill in the art will recognize many variations, modifications, and alternatives.

Figure 2:
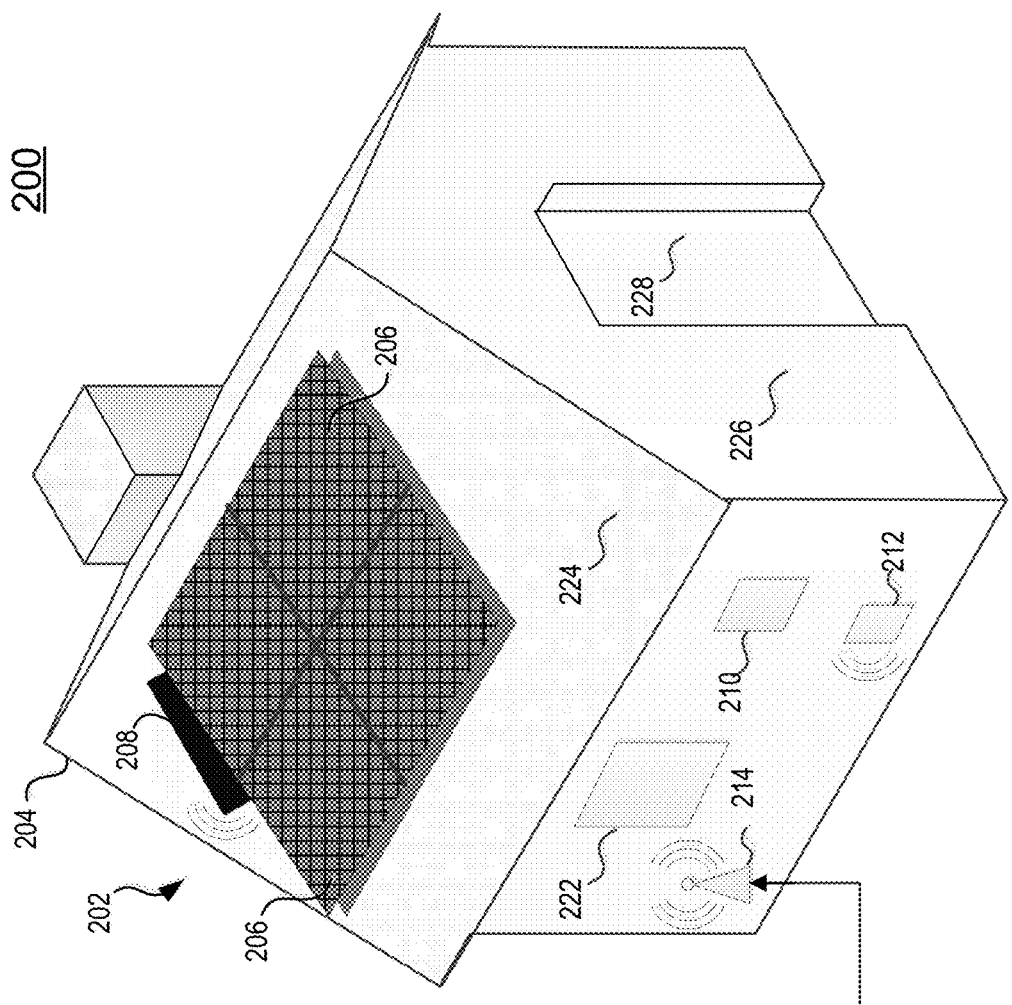
FIG. 2 is a simplified block diagram illustrating at least some features of a system environment for generating energy efficiency model of a site as described herein.
Figure 2:
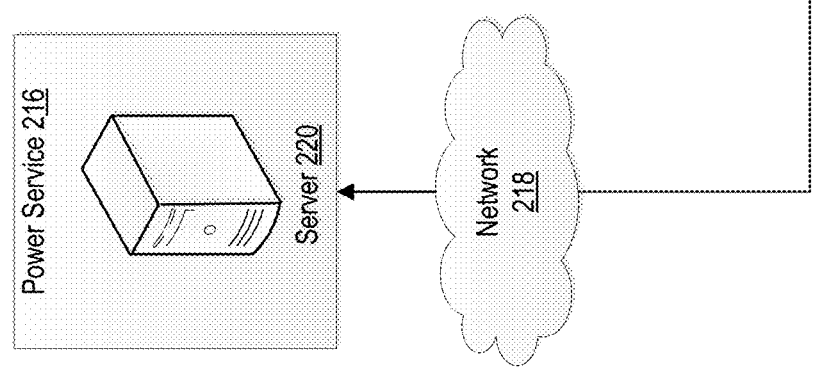

FIG. 2 illustrates a block diagram of an example EGS system environment 200 in accordance with some embodiments of the present disclosure. As will be appreciated, although environment 200 is provided for purposes of explanation, different environments may be utilized, as appropriate, to implement various embodiments. For example, although a residential dwelling is shown in FIG. 2, environments in accordance with embodiments of the present disclosure can include any suitable structure capable of supporting one or more solar panels in addition to photovoltaic power stations (e.g., solar farms), and the like. Similarly, embodiments of the present disclosure include environments that facilitate other types of renewable energy including, but not limited to, wind power, hydropower, biomass power, geothermal power, and the like. More generally, features and functionalities of the methods, systems, and apparatus described herein in the context of solar power, can also be implemented in the context of such other renewable energy resources.

As shown in FIG. 2, environment 200 can include a solar power system 202 located at a user's home 204. Solar power system 202 can include photovoltaic solar panels 206 and an inverter 208. Solar panels 206 can convert sunlight into low-voltage direct current (DC). Inverter 208 converts the low-voltage DC into higher-voltage alternating current (AC), such as 110 VAC, 220 VAC, or 480 VAC.

In some embodiments, environment 200 further includes an electrical panel or "breaker box" 210, which includes fuses and circuit breakers that distribute electricity to the user's electrical loads. Net-metering can be performed by transferring excess electrical power from inverter 208 to a utility, which may be under contract or other legal obligation to accept and pay for such excess power. For example, inverter 208 or another component can push excess electrical power generated by solar power system 202 through a utility meter 212 and onto a utility grid. The utility may "buy" this excess power by crediting the user's utility account for the amount of power pushed onto the grid. For example, when power is pushed from solar power system 202 to the utility grid, utility meter 212 turns backwards, thereby updating usage data for the user in a memory of utility meter 212 which can be monitored by the utility company and/or a power service 216 as described in further detail below.

Solar power system 202 and the electric utility grid can provide power in parallel. For example, when the sun is shining, solar power system 202 can push any extra electricity it generates onto the grid. At night, loads are drawn from the utility grid. In some embodiments, a system integrator can set up a net-metering relationship with the local utility, enabling users to sell excess power back to the utility during peak hours when rates are high, and to buy electricity during non-peak hours when the rates are low.

In some embodiments, solar power system 202 can be standardized or unique, configured to the custom specifications of each user and/or that of user's home 204. For example, a system integrator may visit user's home 204 to determine the best size, mounting arrangement and positioning for solar power system 202. A detailed design and installation plan can then be engineered.

In some embodiments, solar power system 202 may include a battery device and a battery inverter/charger for storing extra electricity production or storing energy from utility grid when grid energy cost is low. The battery inverter/charger can then dispatch the stored energy at a later time to appliances at the site or feed it back onto the utility grid when there is high demand for energy and/or the energy price is high.

In some embodiments, environment 200 includes a gateway 214 and the power service 216. Gateway 214 is generally located at a user's home 204 and is communicatively coupled with components at user's home 204. For example, gateway 214 can be communicatively coupled with inverter 208 and utility meter 212. The gateway is also communicatively coupled with power service 216 via a network 218, such as the Internet. In some embodiments, gateway 214 can be a standalone device that is separate from the other components at house 204. In some embodiments, gateway 214 can be fully or partially embedded or integrated with one or more components at house 204. In some embodiments, power service 216 is or includes a server 220 that is remote from user's home 204. Server 220 can also include a cluster of server computers. When server 220 is a cluster of server computers, one or more of the server computers may be included in and controlled by entities other than power service 216. Power service 216 may be operated by, for example, the installer or service provider of solar power system 202, a utility company, or some other entities.

Gateway 214 and power service 216 can carry out various tasks for monitoring the performance of solar power system 202. For example, gateway 214 can collect system operating statistics, such as the amount of photovoltaic energy produced and energy usage at the user's home 204 (via inverter 208), the energy flow to and from the utility grid (via utility meter 212), and so on. Gateway 214 can then send this data to power service 216 via network 218 for logging and system performance modeling and/or analysis.

In some embodiments, power service 216 monitors and analyzes data collected at the user's home. For example, data reports can be collected periodically or continuously about one or more of current, voltage, or power coming from solar panels 206 and/or utility grid, outside temperatures at their respective locations, operating temperature of inverter 208, user electrical loads supplied by electrical panel 210, utility meter 212 readings, condition of the utility grid at that feed point, occupancy sensors, building temperature, etc.

As also shown in FIG. 2, a building structure, such as the user's home 204, may be of different size, structure, material and orientation, and may include windows 222, roof 224, walls 226 and doors 228 of various size, area, or number. Thus, depending on the volume of air, orientation, surface area, material and structure, and types and numbers of windows, roof, walls and doors, a building could have very different energy efficiencies. For example, it may take ten minutes for a building of certain size to be heated up from 50° F. to 65° F., while it may take an hour for another building of similar size to be heated up from 50° F. to 65° F. As another example, it may take 30 minutes for a building with poor insulation to be heated up from 50° F. to 65° F. on a normal day, while it may take an hour for the same building to be heated up from 50° F. to 65° F. on a windy day, even if the outside temperature remains the same.

In addition, efficiency and power of electrical appliance may affect the building's energy efficiency as well. For example, it may take ten minutes for a building to be heated up from 50° F. to 65° F. with a more powerful and/or efficient heater, while it may take 30 minutes for the building to be heated up from 50° F. to 65° F. with a less efficient or less powerful heater. Thus, because many factors may affect the energy efficiency of a building, it is difficult to create an accurate model by directly considering the effect of each factor.

II. Examples of System for Site Energy Efficiency Modeling and/or Energy Usage Optimization Some embodiments of the present disclosure describe example systems that can be used to generate simplified but accurate energy efficiency model of a site based on direct measurement results, without the need of considering contribution of each factor that may affect the energy efficiency of the site. In some embodiments, the site may be treated as a block box with no specific information regarding the structure of the site needed for the modeling.

Figure 3A:
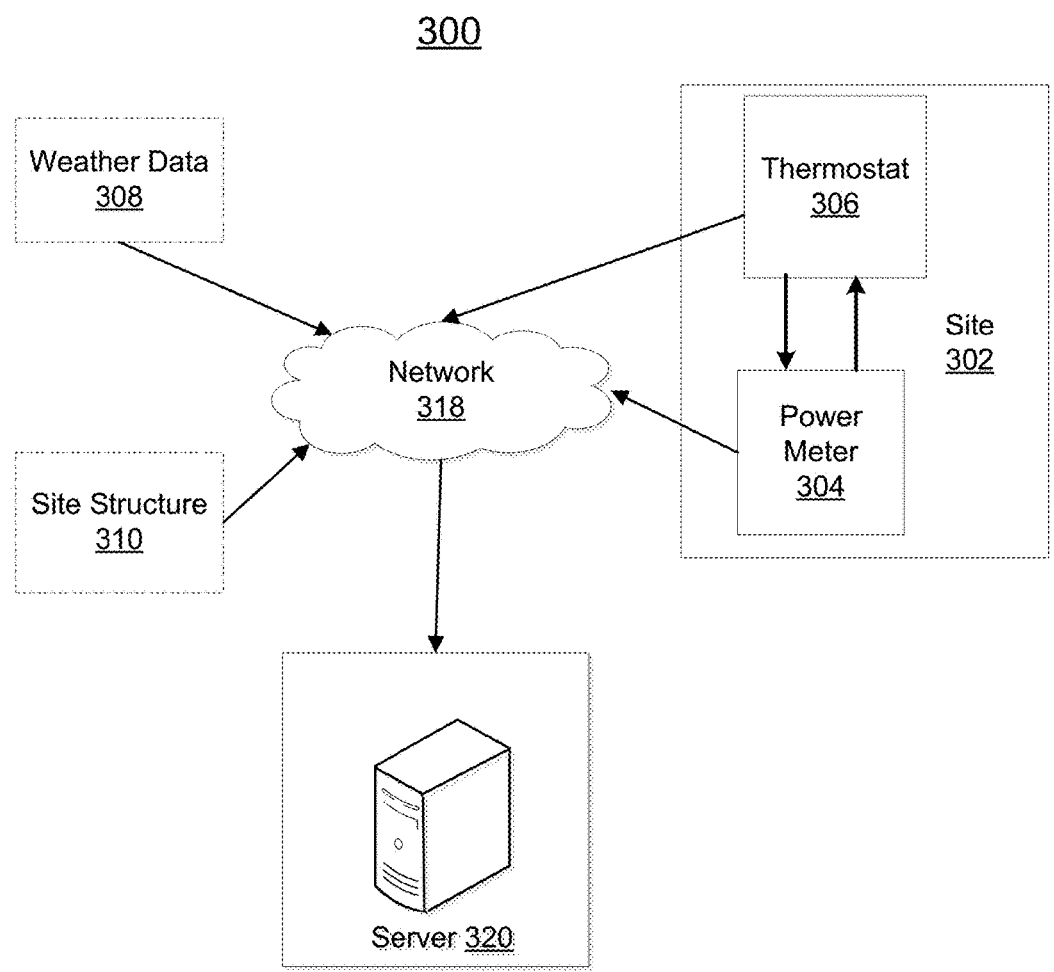
FIG. 3A illustrates a system for generating energy efficiency model of a site, according to at least one example.

FIG. 3A illustrates a simplified block diagram of a system 300 for site energy efficiency modeling, according to some embodiments of the present disclosure. In some embodiments, system 300 includes a single power meter 304 and a thermostat 306 installed at a site 302, such as a building or a dwelling home. Power meter 304 may be connected to an entry point of the electricity network of the site on one end, and to a utility power grid and/or a PV system on another end. Power meter 304 can measure the total power consumption at the site over time periodically or continuously, and send the measurement results, through a network 318, to a server 320, which may be operated by, for example, an installer or service provider of a solar power system, a utility company, or some other entities. In some embodiments, power meter 304 may be connected to network 318 through a gateway.

Thermostat 306 may be a programmable thermostat that can set and measure temperature within the site, and can be operatively coupled to an appliance, such as an air condition or a heater, to adjust the site temperature. Thermostat 306 can also record the exact time the appliance is turned on or off. Thermostat 306 may also record the starting temperature, the set temperature, and the change of the temperature of the site over time. Thermostat 306 may send recorded and measured data to server 320 through network 318. Because the exact time when the appliance is turned on or off is known, the corresponding power consumption of the appliance and temperature change of the site over time can be more accurately determined even with only one power meter, as there is no need to determine which appliance is functioning at what time.

In some embodiments, thermostat 306 may also include activity sensors to measure activities in the site and report whether the site is occupied. In some embodiments, thermostat 306 may include or is connected to multiple temperature sensors that can measure temperature at different locations within the site and/or outside of the site. In some embodiments, thermostat 306 may be connected to the Internet or a proprietary network through, for example, Wi-Fi connection or a gateway as discussed above, to access weather conditions and forecast. In some embodiments, thermostat 306 may be a Nest Thermostat or similar thermostats. In some embodiments, thermostat 306 may sends measurement data to server 320 through network 318 via the gateway.

Additionally or alternatively, system 300 may use stand-alone sensors, such as a temperature sensor, a motion sensor, a power sensor, and a photo sensor, to measure temperature, appliance activities, or occupant activities at the site. System 300 may also use sensors or other devices integrated into other smart appliances or mobile devices to gather relevant data at the site.

In some embodiments, server 320 may receive weather data 308 from other sources, such as a weather service providers, rather than thermostat 306, through network 318. Weather data 308 may include current weather condition, such as temperature, wind, cloud condition and humidity, as well as future weather condition forecast.

FIG. 3B illustrates examples of measurement results of power meter 304 and thermostat 306. Power meter measurement result 352 illustrates an example of total power consumption of a site during a period of time T. In the example, from time t0 to time t1, the total power consumption is at a stable baseline level 350. At around time t1, the total power consumption starts to surge. From time t1 to time t2, the total power consumption fluctuates, but is still at a relatively high level. At around time t2, the total power consumption reduces drastically, and settles at baseline level 350 eventually. An example of corresponding thermostat status 354 shows that, at around time t1, the thermostat turns on a heater, and at around time t2, the thermostat turns off the heater. An example of corresponding measured site temperature 356 shows that, at around time t1, the site temperature starts to rise gradually, and, at around time t2, the site temperature starts to drop gradually at a slower rate. Thus, these measurement results indicate that the power consumption surge between time t1 and t2 is mainly caused by the heater. The shaded area below power meter measurement result 352 and above baseline level 350 thus represents the total energy consumption of the heater during operation. The rate of temperature change between t1 and t2 when the heater is turned on depends at least on the efficiency and power of the heater and the energy efficiency of the site. The rate of temperature drop after the heater is turned off at around time t2 directly related to the energy efficiency of the site in keeping heat.

Based on the measurement data from thermostat 306 and power meter 304, and the temperature inside and outside of the site, an energy transfer function can be derived for the site to quantify the energy efficiency of the site. The energy transfer function may be any combination of a radiative energy transfer function, a convective energy transfer function, and a conductive energy transfer function. The energy transfer function may be a function of many contributing factors. For factors whose contribution to the energy transfer function is not easy to quantify, various machine learning methods based on actual measurement data under different conditions may be used to determine how these factors affect the energy transfer function.

It is noted that the efficiency and power of an appliance may remain stable over a relatively long period of time. Thus, the effect of the appliance may not need to be separately considered when modeling the energy efficiency of the site for a certain period of time. In addition, because thermostat 306 and power meter 304 can continuously measure relevant data, the energy efficiency model of the site can also be updated continuously. Thus, any change or degradation in energy efficiency of the appliance is automatically taken into consideration in the modeling using the most recent measurement data. In some embodiments, if there is a drastic change or degradation in the energy efficiency of an appliance, and thus the energy efficiency of the site, an alert can be sent to a user of the site with notification of the change or degradation of the appliance.

In some embodiments, server 320 may also receive site structure information 310, such as the volume of air, orientation, surface area, material and structure, insulation, and types, orientation, and numbers of windows, roof, walls and doors of a building. In some embodiments, site structure information 310 may be obtained by retrieving one or more of satellite, aerial, and street images of the site from, for example, a publically accessible mapping service. Based on the site structure information, weather condition, the measured power consumption and thermostat data, the effects of the site structure and/or weather condition on the energy efficiency of the site can be used as additional parameters to fine tune the energy transfer function of the site for a more accurate model under different weather conditions, such as, for example, different wind speed and direction, or different cloud condition.

In some embodiments, whether the site is occupied or not may affect the energy efficiency modeling significantly, at least partially because human or animal bodies are heat sources. In addition, a person in the site may open a door or window from time to time, thus may cause additional heat loss. People at the site may use other appliances, such as TV, computer, oven, and stove. These appliances may generate heat as well. In some embodiments, server 320 may obtain information on whether the site is occupied from, for example, the activity sensors of thermostat 306 or stand-alone activity sensors. In some embodiments, sudden change in temperature in the site may indicate that a window or door has been open, thus it is likely that the site is occupied. Based on historical measurement data, whether the site is occupied or not can be used as an additional parameter to fine tune the energy efficiency model. Personal mobile devices, such as a smart phone, a tablet, or a wearable device, may also be used to determine the occupancy of the site.

In some embodiments, server 320 may generate the energy efficiency model of the site. In some embodiments, other servers may generate the energy efficiency model based on instructions and data provided by server 320. In some embodiments, server 320 or other servers may perform a machine learning algorithm using predicted data and actual measurement data to optimize the model for different weather conditions.

Figure 4:
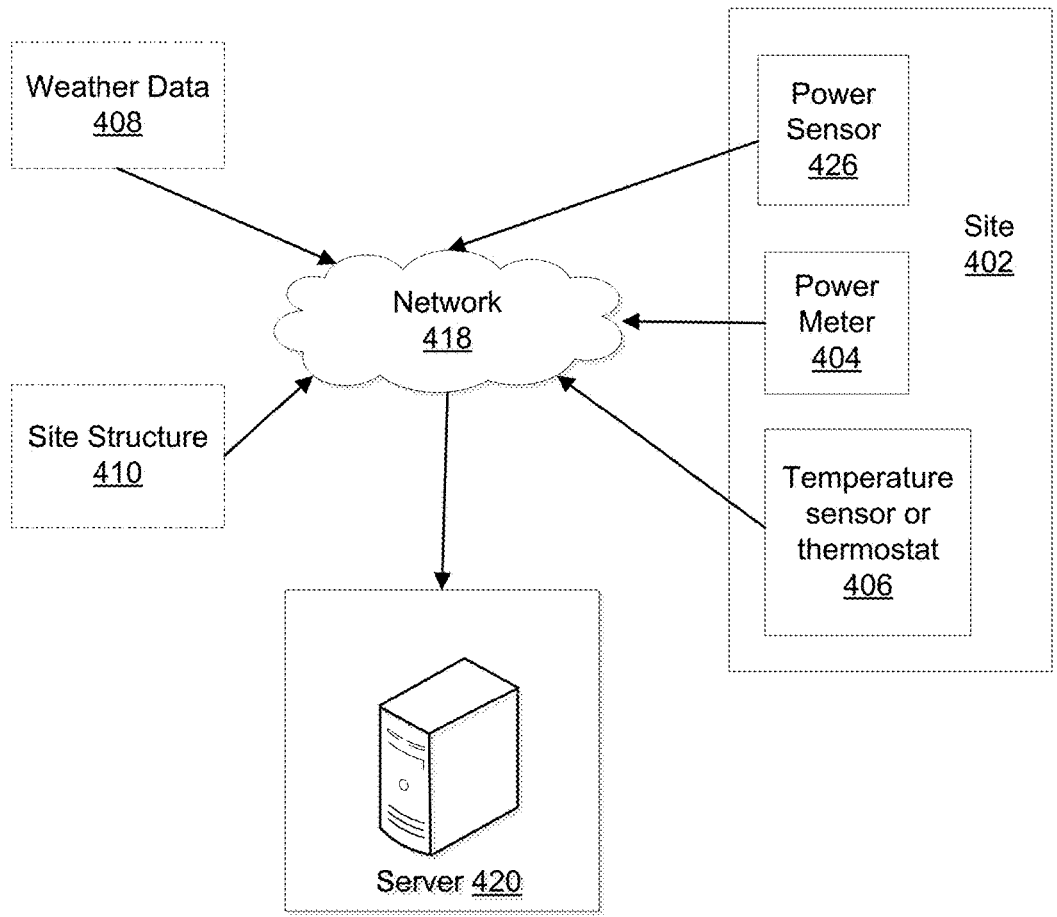
FIG. 4 illustrates another system for generating energy efficiency model of a site, according to at least one example.

FIG. 4 illustrates a simplified block diagram of a system 400 for home energy efficiency modeling, according to some embodiments. System 400 includes a single power meter 404 and a power sensor 426 installed at a site 402. Power meter 404 may be connected to an entry point of the electricity network of the site on one end, and to a utility power grid and/or a PV system on another end. Power meter 404 can measure the total power consumption at the site over time periodically or continuously, and send the measurement results through a network 418 to a server 420, which may be operated by, for example, an installer or service provider of a solar power system, a utility company, or some other entities. In some embodiments, power meter 404 may be connected to network 418 through a gateway.

In some embodiments, power sensor 426 may be a sensor installed in the breaker panel of a site. Power sensor 426 can measure one or more of voltage signals and current signals, and send the measured signals to server 420 through network 418 for processing. Power sensor 426 may be connected to network 418 through a gateway or Wi-Fi. In some embodiments, power sensor 426 may be a sensor such as a Neurio sensor or other similar sensors.

From the voltage signals and/or current signals measured by power sensor 426, server 420 may extract electrical signatures of interest, and compare the extracted electrical signatures with electrical signatures of appliances used in the site to determine which appliance is turned on or off, and the time it is turned on or off. In some embodiments, server 420 may extract electrical signatures by power spectral analysis through, for example, Fourier transform of the voltage signals and/or current signals. In some embodiments, server 420 may extract electrical signatures by analyzing the transient characteristics of pulses or edges in the voltage or current signals in time domain. Server 420 may then compare the electrical signatures extracted from the power sensor data against known electrical signatures of appliances used at the site. If the known electrical signature of an appliance matches one of the extracted electrical signatures, server 420 may determine that the appliance was turned on or off during the period of time when the power sensor data was collected.

In some embodiments, system 400 may also include a temperature sensor or a thermostat 406 for measuring the condition of the site, such as room temperature of the site. In some embodiments, system 400 may also include activity sensors or motion sensors for monitoring the activities inside the site to determine whether the site is occupied and/or the number of people within the site at a given time. System 400 may also use stand-alone sensors or sensors integrated into other smart appliances or mobile devices, such as a smart phone, a tablet, or a wearable device, to measure relevant data at the site. Data measured by various sensors can be sent to server 420 through network 418.

In some embodiments, server 420 may receive weather data 408 from sources such as temperature sensors and weather databases. Weather data 408 may include current weather condition, such as temperature, wind speed and direction, cloud condition and humidity, as well as future weather condition forecast.

Based on the measurement data from the power meter, the information extracted from the voltage signals and/or current signals measured by power sensor 426, and the temperature inside and outside of the site, an energy transfer function can be derived for the site to quantify the energy efficiency of the site. The energy transfer function may be any combination of a radiative energy transfer function, a convective energy transfer function, and a conductive energy transfer function. The energy transfer function may be a function of many contributing factors. For factors whose contribution to the energy transfer function is not easy to quantify, various machine learning methods based on actual measurement data under different conditions may be used to determine how these factors affect the energy transfer function.

Because the efficiency and power of an appliance may remain stable over a relatively long period of time, the effect of the appliance may not need to be separately considered when modeling the energy efficiency of the site for a certain period of time. In addition, because the power sensor and the power meter can continuously measure relevant data, the energy efficiency model of the site can also be updated continuously. Thus, any change or degradation in energy efficiency of the appliance is automatically taken into consideration in the modeling using most recent measurement data.

In some embodiments, server 420 may also receive site structure information 410, such as the volume of air, orientation, surface area, material and structure, insulation, and types, orientation and numbers of windows, roof, walls and doors of a building. In some embodiments, site structure information 410 may be obtained by retrieving one or more of satellite, aerial, and street images of the site from, for example, a publically accessible mapping service. Based on the site structure information, weather condition, and the measured power consumption and thermostat data, the effects of the site structure and/or weather condition on the energy efficiency of the site can be used to as additional parameters to fine tune the energy transfer function of the site for a more accurate model under different weather conditions, such as, for example, different wind speed and direction, or different cloud condition.

In some embodiments, whether the site is occupied or not may significantly affect the energy efficiency modeling at least partially because human or animal bodies are heat sources. In addition, a person in the site may open a door or window from time to time, thus may cause additional heat loss. People at the site may use other appliances, such as TV, computer, oven, and stove. These appliances may generate heat as well. In some embodiments, server 420 may obtain information on whether the site is occupied from activity sensors. In some embodiments, sudden change in temperature in the site may indicate that a window or door has been open, thus it is likely that the site is occupied. Based on historical measurement data, whether the site is occupied or not can be used as an additional parameter to fine tune the energy efficiency model. Personal mobile devices, such as a smart phone, a tablet, or a wearable device, may also be used to determine the occupancy of the site.

Due to different combinations and interactions between appliances, and thus the complexity of the measured signals by the power sensor, it is may be difficult to accurately determine which appliances and when the appliances are turned on or off if multiple appliances are activated and/or deactivated at or during the same time period. In some embodiments, a system for home energy efficiency modeling may include both a power sensor and a thermostat, such that activities of some major appliances are known from data provided by the thermostat, and activities of other appliances maybe determined from voltage signals and/or current signals measured by a single power sensor. In this way, the system may generate more accurate energy efficiency model without requiring a sensor for each individual appliance.

Figure 5:
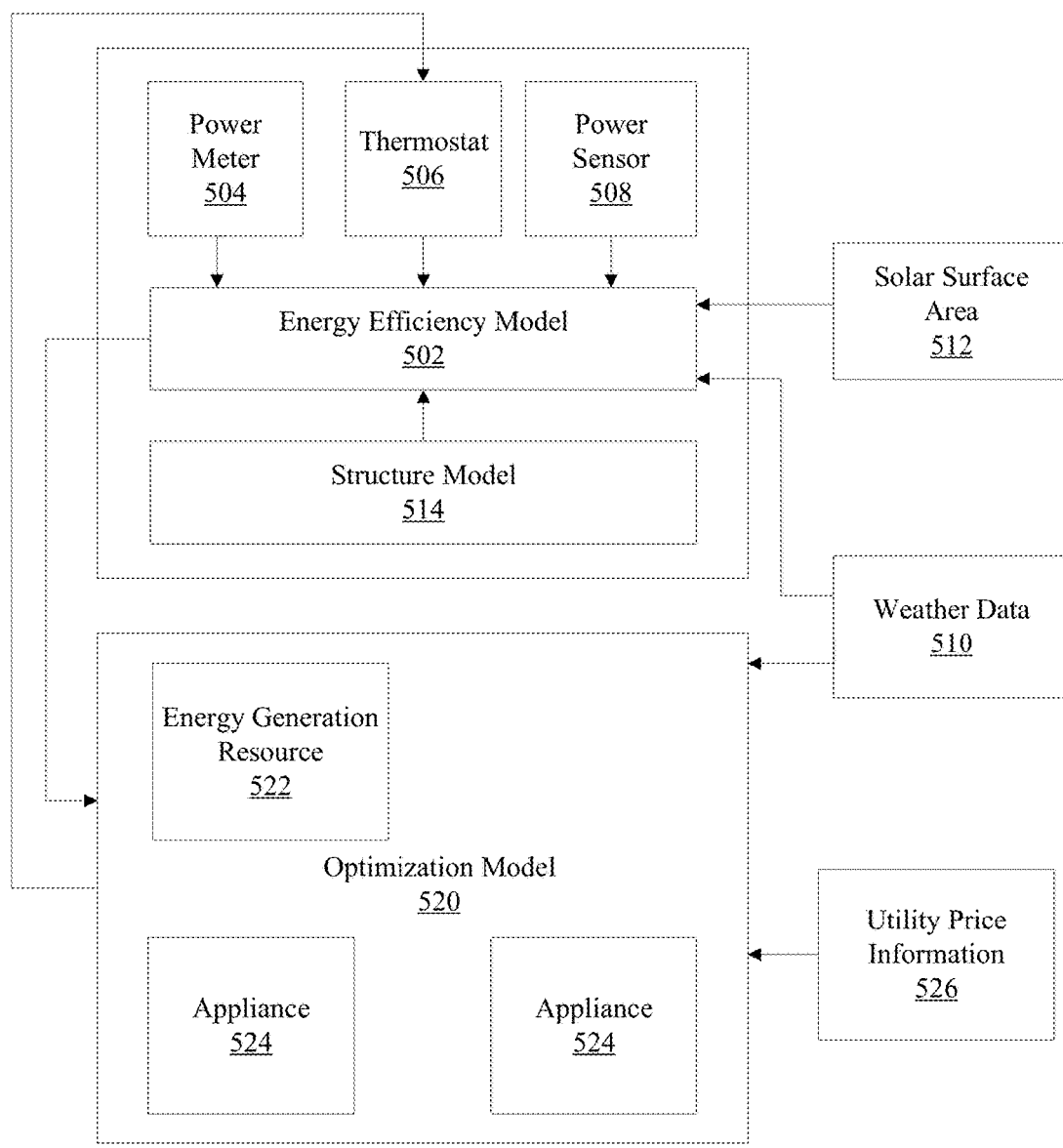
FIG. 5 illustrates a system for generating energy efficiency model of a site and optimizing energy usage of the site based on the generated energy efficiency model, according to at least one example.

FIG. 5 illustrates a system 500 for modeling energy efficiency of a site and optimizing energy usage based on prediction from the energy efficiency model. Similar to systems 300 and 400 described above with respect to FIGS. 3 and 4, system 500 generates energy efficiency model 502 of a site using various data, such as measurement results from a power meter 504, a thermostat 506 and a power sensor 508, weather data 510, information on solar surface area 512, and a structure model 514 of the site.

System 500 may also include an optimization model 520. In some embodiments, optimization model 520 may analyze energy efficiency model 502, compare the model of a site with a similar site, and provide recommendations for improving energy efficiency of at least one of the sites, such as, for example, better insulating or sealing, replacing older windows and doors, maintaining sealed heating and cooling ducts and clean filters, and upgrading outdated or degraded heating and cooling systems, air conditioners or ventilation fans.

In some embodiments, optimization model 520 may also estimate power usages based on energy efficiency model 502 of a site and weather data 510. On the basis of the estimated power usage of each site in a service area and utility price information 526, optimization model 520 may provide recommendations to user of each site on how to reduce energy usage and energy cost. For example, optimization model 520 may suggest heating up the site at a time when the utility price is low, increasing or reducing the set temperature point by a few degrees to reduce energy usage by an estimated amount, whether and when to use power generated from an energy generation resource 522 or power from a utility grid, when to charge a battery device at the site with power from energy generation resource 522 or the utility grid, or whether and when to send power generated from energy generation resource 522 to the utility grid.

In some embodiments, optimization model 520 may directly control the operation of thermostat 506 and other appliances 524 under optimum operational conditions based on information, such as estimated power usage, utility price information, and information regarding the occupancy of the site. In some embodiments, a user may override or adjust the settings of thermostat 506 and other appliances 524 set automatically using optimization model 520.

Figure 6:
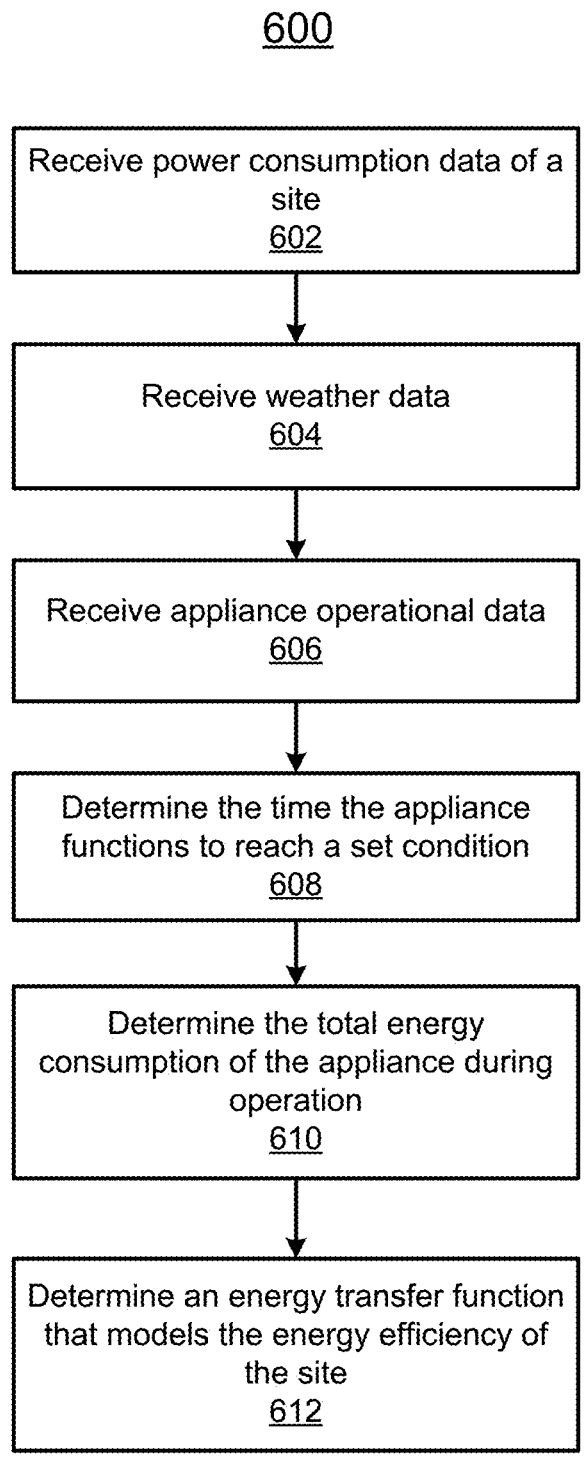
FIG. 6 is a simplified flow diagram illustrating an example process for modeling energy efficiency of a site.

III. Examples of Method for Site Energy Efficiency Modeling and/or Energy Usage Optimization FIG. 6 illustrates an example flow diagram 600 that may be carried out by server 320 of FIG. 3A for modeling energy efficiency of a site, such as a residential home or a building, based on data from power meter 304 and thermostat 306. As described above with respect to FIG. 3A, power meter 304 can measure the total power consumption at the site, while thermostat 306 may set and measure temperature at the site, and also record the time when an appliance is turned on or off.

At block 602, server 320 receives power consumption data of the site measured by power meter 304. The power consumption data can be collected and sent to server 320 periodically or continuously by power meter 304 through network 318 or a gateway.

At block 604, server 320 receives weather data from a weather service provider or weather data measured on-site by temperature sensors, barometers, or anemometers. The weather data may include current weather condition, such as temperature, wind speed and direction, cloud condition and humidity.

At block 606, server 320 receives appliance operational data, such as when an appliance is turned on or off, the starting condition (e.g., the initial room temperature) of a site when the appliance is turned on, the condition (e.g., the room temperature) of the site when the appliance is turned off, and the change of the condition over time during the operation of the appliance and/or after the appliance is turned off.

At block 608, server 320 determines, at least partially from the appliance operational data, the time for the appliance to change the site from one condition (e.g., an initial temperature) to another condition (e.g., a set temperature). For example, in the case of an air conditioner, server 320 may determine that it took 15 minutes for the air conditioner to increase the inside temperature of a site from 60° F. to 65° F., or 20 minutes to increase the inside temperature of the site from 65° F. to 70° F., at a given temperature outside of the site. In some embodiments, the outside temperature may change over time as well, thus the determined time period may have starting inside and outside temperatures, and ending inside and outside temperatures associated with it. In some embodiments, server 320 may also determine the time it took for a site to change from one condition to another condition after the appliance was turned off. This information may indicate how well the site is insulated and the ability of the site to keep the heat in or out of the site.

At block 610, server 320 may determine the total energy consumption by the appliance based on the measure power consumption data and the determined operational time of the appliance. For example, as shown in the examples in FIG. 3B, total power consumption 352 may include a baseline power consumption level 350 by other appliances, and the shaded area above the baseline power consumption level 350 between time t1 and time t2 represents the total energy consumption of the appliance during operation.

At block 612, server 320 determines an energy transfer function based on one or more of the energy consumption of the appliance, operational period of the appliance, condition (e.g., temperature) change during the operational period, and the temperature outside of the site. The energy transfer function may quantitively describe the energy efficiency of the site. Because the exact time that the appliance is turned on or off is recorded along with the condition at the corresponding time, the estimation of the total energy consumption and operational time, and thus the energy efficiency model of the site may be more accurate. The energy transfer function may be any combination of a radiative energy transfer function, a convective energy transfer function, and a conductive energy transfer function. The energy transfer function may be a function of many contributing parameters.

In some embodiments, the effect of other parameters on the energy efficiency of the site can also be incorporated into the energy transfer function for even more accurate modeling under various conditions. These parameters include, for example, weather condition such as wind speed and direction, cloud condition and humidity, site structure information such as the volume of air, orientation, surface area, material and structure, insulation, and types and numbers of windows, roof, walls and doors of a building, and the occupancy of the site. It is noted that the effect of some of these parameters on the energy efficiency of the site may have already been taken into considered when actual measurement data is used for the modeling. In some embodiments, the effect of some of these parameters on the energy efficiency of the site may be very small and thus can be neglected in order to reduce the computing complexity of the model. For parameters whose contribution to the energy transfer function is not easy to quantify, various machine learning methods based on actual measurement data under different conditions may be used to determine how these parameters affect the energy transfer function.

Figure 7:
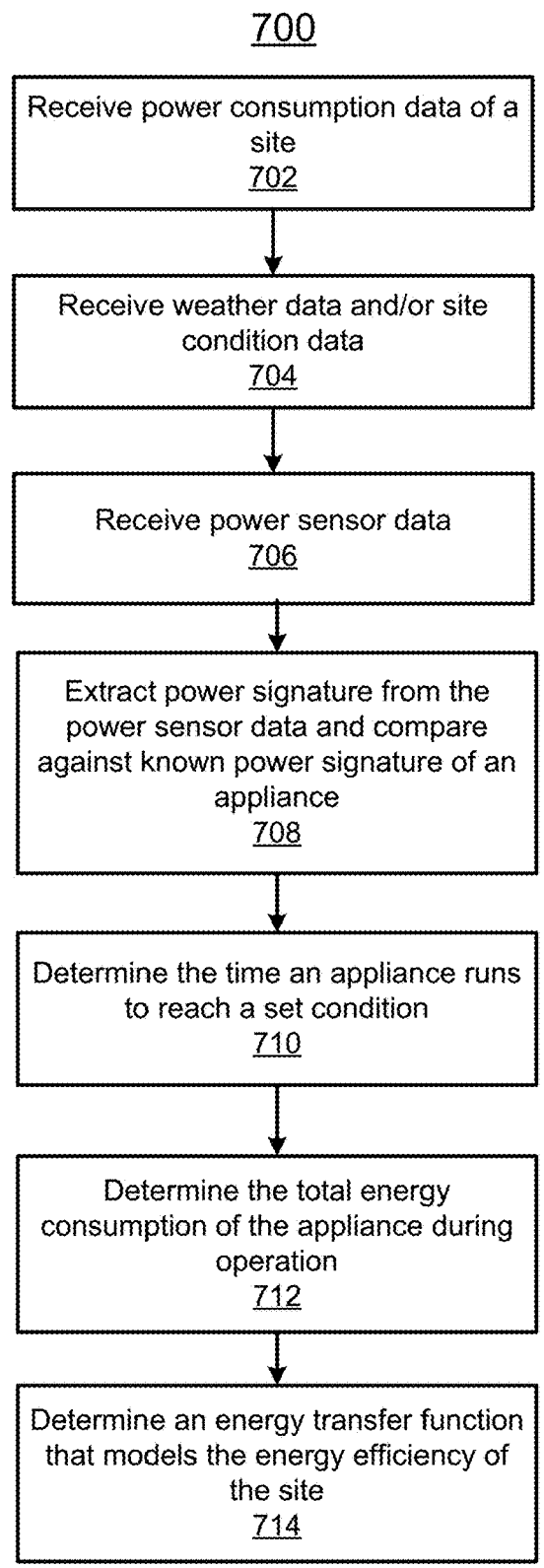
FIG. 7 is a simplified flow diagram illustrating another example process for modeling energy efficiency of a site.

FIG. 7 illustrates an example flow diagram 700 that may be carried out by server 420 of FIG. 4 for modeling energy efficiency of a site, such as a residential home or a building, based on data from power meter 404 and power sensor 426. As described above with respect to FIG. 4, power meter 404 can measure the total power consumption at the site, while power sensor 426 may measure one or more of voltage signals or current signals for determining which appliance is turned on or off at what time.

At block 702, server 420 receives power consumption data of the site measured by power meter 404. The power consumption data can be collected and sent to server 420 periodically or continuously by power meter 404 through network 418 or a gateway.

At block 704, server 420 receives weather data from a weather service provider or weather data measured on-site by temperature sensors, barometers, or anemometers. The weather data may include current weather condition, such as temperature, wind speed and direction, cloud condition and humidity. Server 420 may also receive site condition data, such as temperature inside the site, from various sensors or thermostats.

At block 706, server 420 receives power sensor data from, for example, power sensor 426 through network 418. The power sensor data may include at least one of voltage signals or current signals as functions of time, thus transient characteristics or frequency information may be extracted from the voltage signals and/or current signals.

At block 708, server 420 extracts electrical signatures from the power sensor data. In some embodiments, server 420 may extract electrical signatures by power spectral analysis through, for example, Fourier transform of the voltage signals and/or current signals. In some embodiments, server 420 may extract electrical signatures by analyzing the transient characteristics of pulses or edges in the voltage or current signals in time domain. Server 420 may then compare the electrical signatures extracted from the power sensor data against known electrical signatures of appliances used at the site. If the known electrical signature of an appliance matches one of the extracted electrical signatures, server 420 may determine that the appliance was turned on or off during the period of time when the power sensor data was collected.

At block 710, once an appliance is determined to have been turned on or off during a period of time, the system may identify the exact time when the appliance is turned on or off from the voltage signals and/or current signals in the time domain, and the associate condition of the site at the time. Thus, the time it took the appliance to change the site from one condition (e.g., temperature) to another condition can be determined. For example, in the case of a heater, server 420 may determine that it took 15 minutes for the heater to increase the inside temperature of a site from 60° F. to 65° F., or 20 minutes to increase the inside temperature of the site from 65° F. to 70° F., at a given temperature outside of the site. In some embodiments, the outside temperature may change over time as well, thus the determined time period may have starting inside and outside temperatures, and ending inside and outside temperatures associated with it. In some embodiments, server 420 may also determine the time it took for a site to change from one condition to another condition after the appliance was turned off. This information may indicate the insulation of the site and the ability of the site to keep the heat in or out of the site.

At block 712, server 420 may determine the total energy consumption by the appliance based on the measured power consumption data and the determined operational time of the appliance. The measured power consumption data may include a baseline power consumption by other appliances before the appliance is turned on, which can be deducted from the total power consumption when the appliance is turned on to calculate the total energy consumption of the appliance during operation.

At block 714, server 420 determines an energy transfer function of the site based on one or more of the energy consumption, operational period of the appliance, condition (e.g., temperature) change during the operational period, and the temperature outside of the site. The energy transfer function may indicate the energy efficiency of the site quantitively. The energy transfer function may be any combination of a radiative energy transfer function, a convective energy transfer function, and a conductive energy transfer function. The energy transfer function may be a function of many contributing parameters.

In some embodiments, a system for home energy efficiency modeling may include both a power sensor and a thermostat, such that the activities of some major appliances are known from data provided by the thermostat, and activities of other small appliances may be determined from signals measured by a single power sensor. In this way, the system may generate more accurate energy efficiency model without requiring a sensor for each individual appliance.

In some embodiments, the effect of other parameters on the energy efficiency of the site can also be incorporated into the energy transfer function for more accurate modeling under various conditions. These parameters may include, for example, weather condition such as wind speed and direction, cloud condition and humidity, site structure information such as the volume of air, orientation, surface area, material and structure, insulation, and types and numbers of windows, roof, walls and doors of a building, and the occupancy of the site. It is noted that the effect of some of these parameters on the energy efficiency of the site may have already been taken into considered when actual measurement data is used for the modeling. In some embodiments, the effect of some of these parameters on the energy efficiency of the site may be very small and thus can be neglected in order to reduce the computing complexity of the model. For parameters whose contribution to the energy transfer function is not easy to quantify, various machine learning methods based on actual measurement data under different conditions may be used to determine how these parameters affect the energy transfer function.

Figure 8:
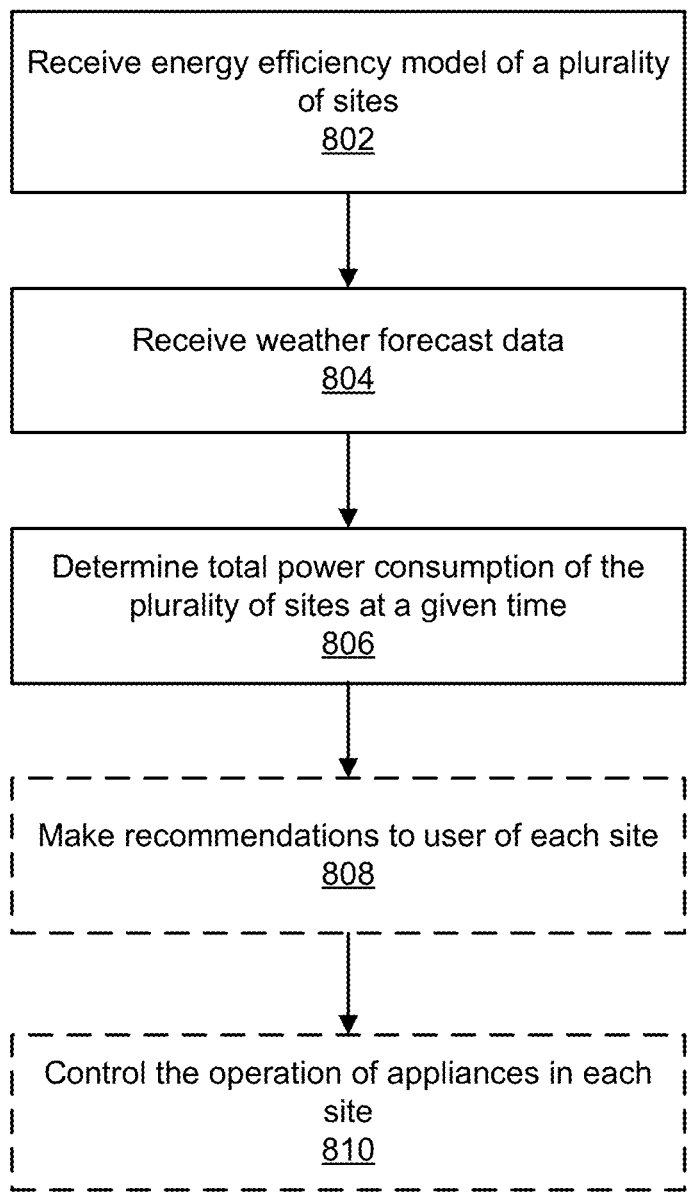
FIG. 8 is a simplified flow diagram illustrating a process for power consumption estimation and optimization based on energy efficiency models of a plurality of sites.

FIG. 8 illustrates a flow chart 800 of determining optimum power usage based on the energy efficiency model generated for each site of a plurality of sites. At block 802, a system may generate or receive energy efficiency models for a plurality of sites and/or other parameters of each site, such as the site structure information and occupancy information. At block 804, the system may receive weather forecast data for each site. At block 806, the system may predict total power consumption of each of the plurality of sites at a given time in the future, and thus the aggregated power consumption in a servicing area.

At block 808, based on the power consumption of each site and/or the aggregated power consumption in a servicing area, the system may give recommendations to the user of each site on how to reduce energy usage and/or energy cost. The recommendations may be based on one or more of the utility price at different time, the total predicted power consumption for a servicing area, the occupancy of the site, or the amount of reduction in power consumption or energy cost with optimized appliance settings. For example, the system may suggest heating up the site at a time when the utility price is low, and provide corresponding estimated reduction in energy cost. The system may suggest increasing or reducing the set temperature point by a few degrees and provide the estimated amount of reduction in energy usage and/or energy cost. The system may suggest altering the set temperature at different time during a day or turning off the heater of a site when the site is unoccupied, and provide estimated reduction in energy usage and/or energy cost. The system may also suggest whether and when to use power generated from an energy generation resource at the site or power from a utility grid, when to charge a battery device at the site with power from the energy generation resource or the utility grid, or whether and when to send power generated from the energy generation resource to the utility grid. Based on the recommendations and information such as the estimated reduction in energy usage and/or energy cost, the user may decide whether to follow the recommendations or not.

The recommendations may be any combination of an E-mail message, a text message, a voice message, a graphic message, a video message, a control signal, or instruction code executable by an appliance. The recommendations may be sent to an owner or a user of a site. The recommendations may also be sent to appliances through wired or wireless communication.

Alternatively or additionally, the system may make recommendations or provide information to a utility company, an installer or service provider of EGS systems, or some other entities. For example, the utility company may use the estimated power consumption data to determine an appropriate power production at a given time, an amount of power that needs to be distributed to different power grids in different areas, an amount of power to purchase in order to meet the power consumption demand, or energy price at different time. An installer or a service provider of EGS systems may use the estimated power consumption information to determine, for example, a demand for energy generation and storage in an area, an amount of extra energy generated by the EGS systems that can be feed onto the utility grid at different time, an amount of energy generated by the EGS systems that could be feed onto the utility grid at different time by optimizing the energy usage, or appropriate price of the energy generated by the EGS systems.

Alternatively or additionally, at block 810, the system may automatically control the appliances at a site for optimized setting without intervention of the user. For example, the system may directly control the operation of thermostats and other appliances under optimized operational conditions based on information such as estimated power usage, utility price information, weather, and information related to occupancy of the site. Thus, optimized settings for the appliances, such as set point and operation time, can be programmed dynamically based on real-time measurement and estimation data. The appliances may be automatically programmed through wired or wireless communications, such as Ethernet, Wi-Fi, Bluetooth, or ZigBee. A user may have the option to override or adjust the settings of the appliances programmed automatically by the system.

IV. Computer System Example

Figure 9:
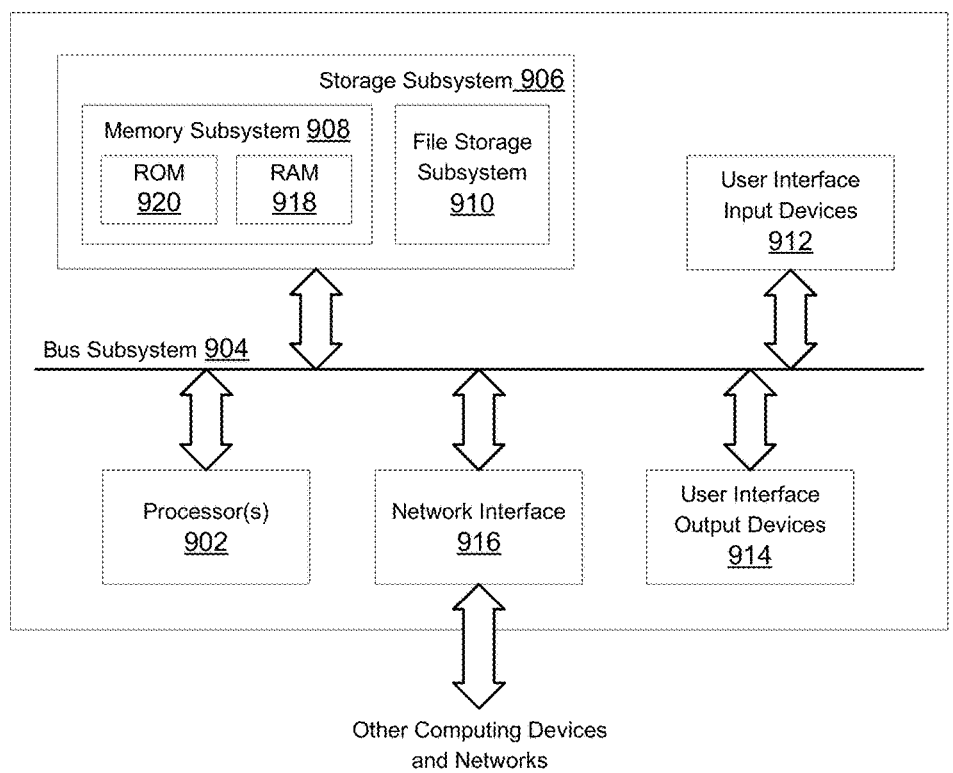
FIG. 9 depicts a simplified block diagram of a computing system for implementing some of the examples described herein, according to at least one example.

FIG. 9 is a simplified block diagram of a computer system 900 according to an embodiment of the present disclosure. Computer system 900 can be used to implement any of the computer systems/devices (e.g., database server 182, web server 180, control server 128, power service 216, gateway devices 214, and server 220, 320 and 420) described with respect to FIGS. 1-4. As shown in FIG. 9, computer system 900 can include one or more processors 902 that communicate with a number of peripheral devices via a bus subsystem 904. These peripheral devices can include a storage subsystem 906 (comprising a memory subsystem 908 and a file storage subsystem 910), a user interface input devices 912, a user interface output devices 914, and a network interface subsystem 916.

In some embodiments, internal bus subsystem 904 can provide a mechanism for facilitating the various components and subsystems of computer system 900 to communicate with each other as intended. Although internal bus subsystem 904 is shown schematically as a single bus, alternative embodiments of the bus subsystem can utilize multiple buses. Additionally, network interface subsystem 916 can serve as an interface for communicating data between computer system 900 and other computer systems or networks (e.g., network 126 of FIG. 1 and/or network 218 of FIG. 2). Embodiments of network interface subsystem 916 can include wired interfaces (e.g., Ethernet, CAN, RS232, RS485, etc.) or wireless interfaces (e.g., ZigBee, Wi-Fi, cellular, etc.).

In some embodiments, user interface input devices 912 can include a keyboard, pointing devices (e.g., mouse, trackball, touchpad, etc.), a barcode scanner, a touch-screen incorporated into a display, audio input devices (e.g., voice recognition systems, microphones, etc.), and other types of input devices. In general, the term "input device" is intended to include all possible types of devices and mechanisms for inputting information into computer system 900. Additionally, user interface output devices 914 can include a display subsystem, a printer, or non-visual displays such as audio output devices, etc. The display subsystem can be any known type of display device. In general, the term "output device" is intended to include all possible types of devices and mechanisms for outputting information from computer system 900.

Storage subsystem 906 can include memory subsystem 908 and file/disk storage subsystem 910. Subsystems 908 and 910 represent non-transitory computer-readable storage media that can store program code and/or data that provide the functionality of embodiments of the present disclosure. In some embodiments, memory subsystem 908 can include a number of memories including a main random access memory (RAM) 918 for storage of instructions and data during program execution and a read-only memory (ROM) 920 in which fixed instructions may be stored. File/disk storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and not intended to limit embodiments of the present disclosure. Many other configurations having more or fewer components than system 900 are possible.

Illustrative methods and systems for modeling energy efficiency and optimizing energy usage of a site are described above. Some or all of these systems and methods may, but need not, be implemented at least partially by architectures such as those shown at least in FIGS. 1-9 above. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User devices or gateways can include any of a number of general purpose personal computers, such as desktop or laptop computers running a standard operating system, as well as cellular, wireless and handheld devices running mobile software and capable of supporting a number of networking and messaging protocols. In some embodiments, a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as any combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from those described above. For example, customized hardware might also be used. In some embodiments, particular elements might be implemented in hardware, software (including portable software, such as applets), or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system for modeling energy efficiency of a site, comprising:
a power meter that measures a total power consumption of the site;
a sensor that measures temperature at the site, and record both measured temperatures of the site over time and activities of a climate control system;
a server to:
receive the total power consumption of the site from the power meter, the measured temperatures of the site and the activities of the climate control system from the sensor, and weather data, remotely through a network;
generate an energy transfer function of the site, based at least partially on the total power consumption of the site, the measured temperatures of the site, the activities of the climate control system, and the weather data, wherein the energy transfer function determines a predicted power consumption of the site as a function of temperature change at the site and time; and
control operations of the climate control system by altering its power consumption based on the generated energy transfer function.

2. The system of claim 1, further comprising an activity sensor configured to detect activities at the site for determining whether the site is occupied.

3. The system of claim 1, further comprising a power sensor configured to measure at least one of voltage signals or current signals provided to the site, wherein the server is configured to generate the energy transfer function of the site, based at least partially on the total power consumption of the site, the measured temperatures of the site, the activities of the climate control system, and the weather data by:
extracting electrical signatures from the at least one of voltage signals or current signals;
determining operational time of an appliance of the climate control system based on the extracted electrical signatures and an electrical signature of the appliance of the climate control system;
determining a power consumption of the appliance of the climate control system based at least partially on:
the total power consumption of the site; and
the operational time of the appliance of the climate control system; and
generating the energy transfer function of the site, based at least partially on the power consumption of the appliance of the climate control system, the measured temperatures of the site, the activities of the climate control system, and the weather data.

4. The system of claim 1, wherein the server is configured to receive at least one of structure information of the site, weather forecast data, or utility price information.

5. The system of claim 1, wherein:
the power meter is configured to measure the total power consumption of the site and send the measured power consumption to the server periodically or continuously;
the sensor is configured to measure the temperature at the site, and transmit both the measured temperature over time and the activities of the climate control system to the server, periodically or continuously; and
the server is configured to generate the energy transfer function of the site periodically or continuously.

6. The system of claim 1, wherein:
the measured temperatures over time include a starting temperature of the site and an ending temperature of the site;
the activities of the climate control system include a starting time of an appliance of the climate control system corresponding to the starting temperature, and an ending time of the appliance of the climate control system corresponding to the ending temperature; and
the server generates the energy transfer function of the site, based at least partially on the total power consumption of the site, the measured temperatures of the site, the activities of the climate control system, and the weather data by:
determining, based at least partially on the total power consumption of the site, the measured temperatures of the site, and the activities of the climate control system:
a time period for the site to reach the ending temperature from the starting temperature; and a power consumption of the appliance of the climate control system from the starting time to the ending time; and generating the energy transfer function of the site based at least partially on the time period for the site to reach the ending temperature from the starting temperature, the power consumption of the appliance of the climate control system from the starting time to the ending time, and the weather data.

\* \* \* \* \*